United States Patent [19]

Beaulier

[11] 4,208,680
[45] Jun. 17, 1980

[54] REAL TIME MAGNETIC VIDEO DIGITAL RECORDING AND REPRODUCING APPARATUS

[75] Inventor: Daniel A. Beaulier, Menlo Park, Calif.

[73] Assignee: Ampex Corporation, Redwood City, Calif.

[21] Appl. No.: 874,440

[22] Filed: Feb. 2, 1978

[51] Int. Cl.² .................. G11B 21/08; H04N 5/78
[52] U.S. Cl. ................................. 360/78; 360/35
[58] Field of Search .............. 360/78, 63, 98, 106, 360/35, 33

[56] References Cited

U.S. PATENT DOCUMENTS

| 3,699,555 | 10/1972 | DuVall | 360/78 |
| 3,838,457 | 9/1974 | Palmer | 360/78 |
| 3,994,016 | 11/1976 | Moghaden | 360/78 |
| 4,030,132 | 6/1977 | Iftikar et al. | 360/78 |
| 4,031,433 | 6/1977 | Droux et al. | 360/78 |

OTHER PUBLICATIONS

"Reviewing Slow Motion Disc Principles"–Lee Stretton, Broadcast Engineering, pp. 14–16 & 18, Feb. 1969.

Primary Examiner—Vincent P. Canney
Attorney, Agent, or Firm—Robert G. Clay; Ralph L. Mossino

[57] ABSTRACT

Apparatus is disclosed for recording real time video information signals on magnetic media by sampling the information signal and converting the samples to a plurality of component digital data streams which are simultaneously recorded on separate surfaces of a single disc pack associated with a generally standard computer disc drive and for thereafter reproducing the plurality of digital data streams and recombining the same in a manner whereby the analog video information signal is reconstructed.

7 Claims, 13 Drawing Figures

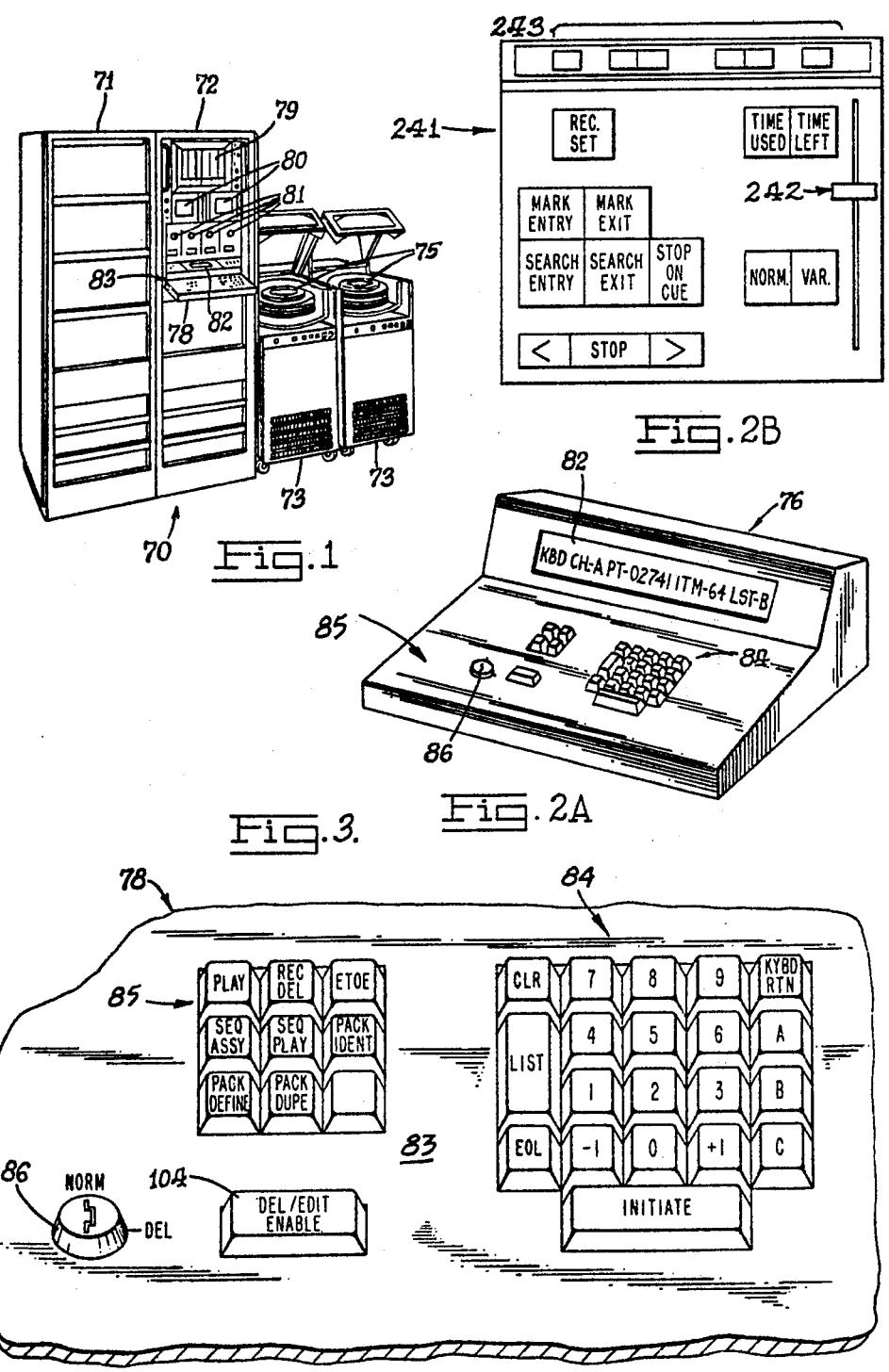

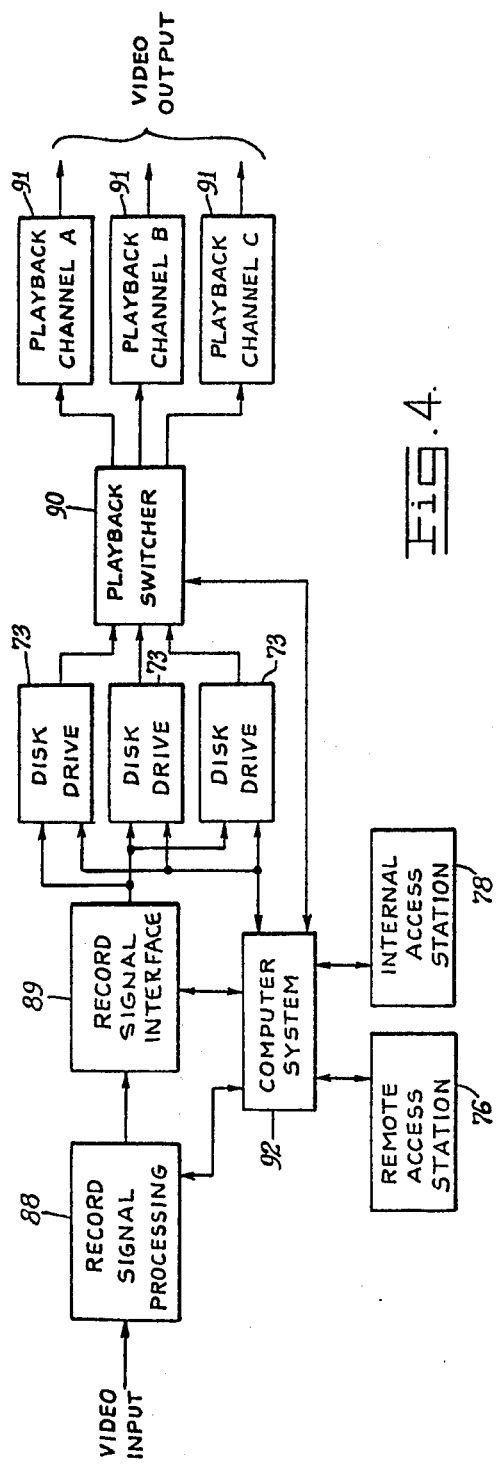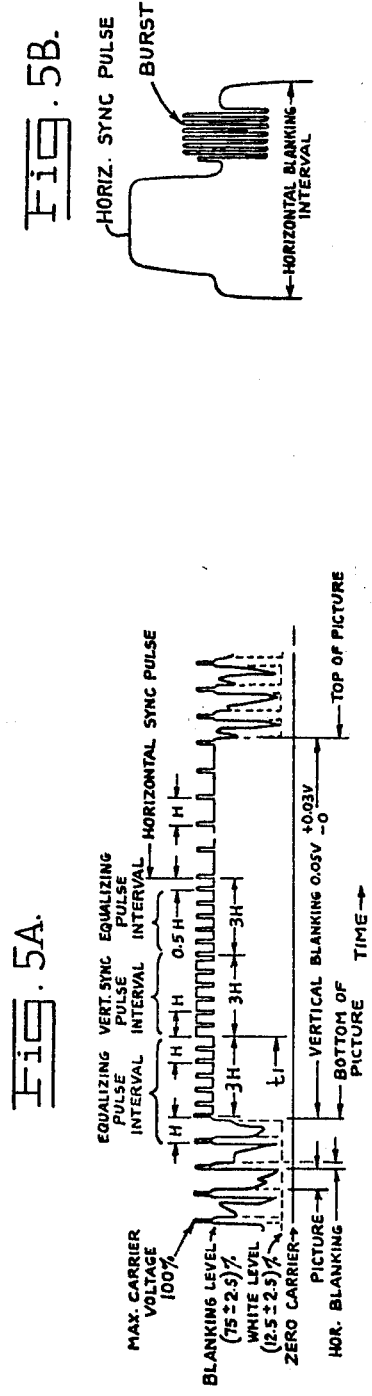

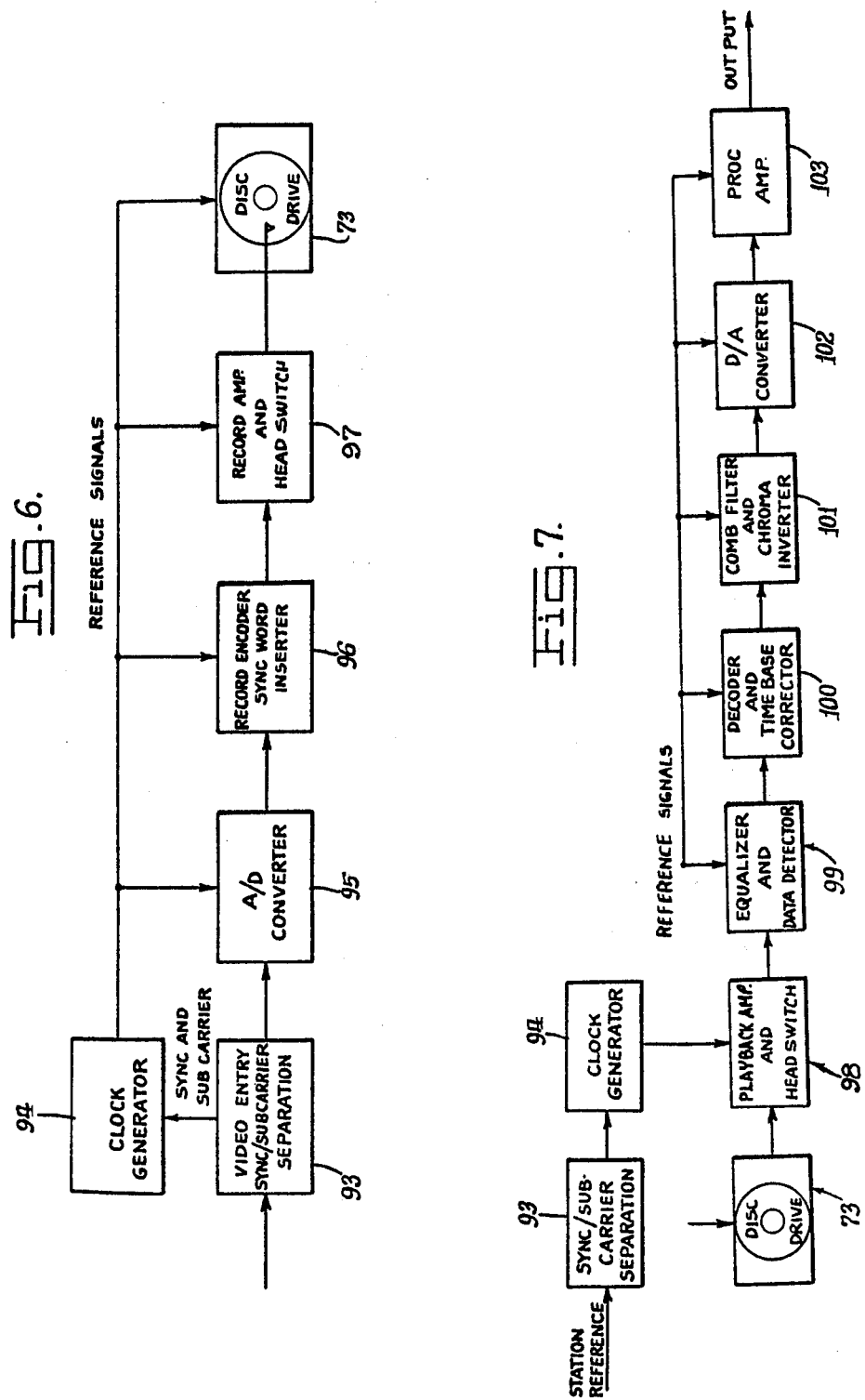

REAL TIME MAGNETIC VIDEO DIGITAL RECORDING AND REPRODUCING APPARATUS

CROSS REFERENCE TO RELATED APPLICATIONS

VIDEO FRAME STORAGE RECORDING AND REPRODUCING APPARATUS, Ser. No. 763,371, filed Jan. 28, 1977, by Joachim P. Diermann and Thomas W. Ritchey, Jr.

PLAYBACK APPARATUS ASSIGNMENT MEANS, Ser. No. 763,462, filed Jan. 28, 1977, by Howard W. Knight and Edwin W. Engberg, now abandoned.

TELEVISION SIGNAL DISC DRIVE RECORDER, Ser. No. 763,795, filed Jan. 28, 1977, by Howard W. Knight and Edwin W. Engberg.

DISC DRIVE RECORDING PROTECTION APPARATUS, Ser. No. 763,761, filed Jan. 28, 1977, by Edwin W. Engberg, now abandoned.

TELEVISION SUBCARRIER PHASE CORRECTION FOR COLOR FIELD SEQUENCING, Ser. No. 763,942, filed Jan. 28, 1977, by Luigi C. Gallo, U.S. Pat. No. 4,145,704.

METHOD AND APPARATUS FOR PROVIDING DC RESTORATION Ser. No. 763,461, filed Jan. 28, 1977, by Luigi C. Gallo, U.S. Pat. No. 4,122,477.

METHOD AND APPARATUS FOR INSERTING SYNCHRONIZING WORDS IN DIGITIZED TELEVISION SIGNAL DATA STREAM, Ser. No. 763,463, filed Jan. 28, 1977, by Luigi C. Gallo.

PRECISION PHASE CONTROLLED CLOCK FOR SAMPLING TELEVISION SIGNALS, Ser. No. 763,453, filed Jan. 28, 1977, by Daniel A. Beaulier and Luigi C. Gallo, U.S. Pat. No. 4,122,487.

DIGITAL TELEVISION SIGNAL PROCESSING SYSTEM, Ser. No. 763,941, filed Jan. 28, 1977, by Luigi C. Gallo, U.S. Pat. No. 4,119,999.

CLOCK SIGNAL GENERATOR PROVIDING NONSYMMETRICAL ALTERNATING PHASE INTERVALS, Ser. No. 763,792, filed Jan. 28, 1977, by Daniel A. Beaulier and Luigi C. Gallo, U.S. Pat. No. 4,122,478.

PHASE LOCK LOOP FOR DATA DECODER CLOCK GENERATOR, Ser. No. 763,793, filed Jan. 28, 1977, by Kenneth Louth and Luigi C. Gallo.

HIGH BIT RATE DATA ENCODER FOR DATA TRANSMISSION SYSTEM, Ser. No. 763,762, filed Jan. 28, 1977, by Luigi C. Gallo.

A CIRCUIT FOR DIGITALLY ENCODING AN ANALOG TELEVISION SIGNAL, Ser. No. 762,901, filed Jan. 26, 1977, by Daniel A. Beaulier, U.S. Pat. No. 4,075,656.

A DIGITAL CHROMINANCE SEPARATING AND PROCESSING SYSTEM AND METHOD, Ser. No. 763,251, filed Jan. 26, 1977, by Robert P. MacKenzie, abandoned in favor of continuation application Ser. No. 765,563, Filed Feb. 4, 1977.

DATA RATE AND TIME BASE CORRECTOR, Ser. No. 763,794, filed Jan. 28, 1977, by Luigi C. Gallo U.S. Pat. No. 4,110,798.

FREQUENCY RESPONSE EQUALIZER, Ser. No. 793,902, filed Jan. 26, 1977, by Jerry W. Miller and Luigi C. Gallo, U.S. Pat. No. 4,110,798.

A CIRCUIT FOR GENERATING A DIGITAL DELETED DATA, BLINKING CROSS SIGNAL WHICH IS STORED IN A DELETED TRACK AND SELECTIVELY DISPLAYED FOR DETECTION, Ser. No. 762,903, filed Jan. 26, 1977, by Luigi C. Gallo and Junaid Sheikh, abandoned in favor of continuation application Ser. No. 765,564, filed Feb. 4, 1977, U.S. Pat. No. 4,130,842.

BACKGROUND AND FIELD OF THE INVENTION

The present invention generally relates to recording and reproducing apparatus and, more particularly, to apparatus that is adapted to record and reproduce real time television signals, using digital techniques.

Recently, a computerized system for recording and playing back slides and other graphic images has been made available for broadcast station useage. The system provides the high reliability and quality of a digital computer system employing magnetic disc pack storage. Such a system is commercially available from Ampex Corporation of Redwood City, California, as the model ESS-1 system and is disclosed and claimed in the aforecited U.S. patent applications.

This system consists of a video signal processor which utilizes digital techniques to store video images on a computer disc memory and which assigns an address to each image to facilitate rapid access. Two or three computer disc drives are employed under control of a system controller including a microcomputer. Access to the system is through keyboard controls located at the electronics rack, or from remote access stations. As many as eight access stations may be incorporated in the system, each equipped with a keyboard terminal and alphanumeric readout Up to 1500 slides or other graphic images may be stored on-line in the typical two-disc pack drive system for immediate access. On-line random access time is less than 100 milliseconds There are two playback channels in the typical system, allowing simultaneous outputs from each on-line disc pack. The system will record color or monochrome images, and operates in four modes: record, play, sequence assembly, and sequence play.

While the aforecited prior art system provided electronic storage and playback of stills, and while it was possible to record and playback video frames at less than real time rates, to obtain a slow motion effect it would be desirable if the system could record and playback television video signals on a real time basis, i.e., 30 frames per second. This capability could have been provided in the prior system by multiplexing the video signals to and from two disc packs, simultaneously. However, this would be costly and would seriously impair the still graphic storage and replay capability of the system.

It would be desirable to employ only one disc pack for the real time television video recording and playback, thereby leaving the second disc drive and disc pack for still graphic storage and replay. However, this was not possible in the prior system because the magnetic recording tracks were circular, each at a predetermined radius from the center of the disc and the magnetic recording/playback transducers of standard computer disc drives could not move from one recording track to the next and maintain and/or achieve time base lock during one vertical interval of television video signal, i.e. 1.3 milliseconds.

OBJECT OF THE INVENTION

Accordingly, it is an object of the present invention to provide an improved recording and playback apparatus that is particularly adapted for recording and reproducing television signals on a real time basis. Another object of the present invention is to provide an apparatus of the foregoing type which requires access to only one computer disc drive for recording and reproducing television signals without impairing the high quality of the reproduced television images.

Other objects and advantages will become apparent upon reading the following detailed description in conjunction with the attached drawings.

DESCRIPTION OF THE DRAWINGS

FIG. 1 is a perspective view of the apparatus embodying the present invention, illustrating its overall appearance, including the internal access station and two disc drive units;

FIG. 2A is an enlarged perspective view illustrating a representative remote access station that an operator can use to control the operation of the apparatus of the present invention in a still store mode;

FIG. 2B is a plan view of a representative slow motion access station that an operator can use to control the operation of the apparatus of the present invention in the real time or slow motion mode;

FIG. 3 is an enlarged top view of a portion of the internal access station keyboard shown in FIG. 1 particularly illustrating the various keys and bars that an operator uses during operation;

FIG. 4 is a broad functional and simplified block diagram of the entire apparatus of the present invention;

FIG. 5A illustrates a portion of a typical television signal illustrating the vertical interval thereof;

FIG. 5B illustrates a portion of a color television signal, particularly illustrating the horizontal synchronization pulse and color burst signal;

FIG. 6 is a functional block diagram broadly illustrating the signal flow path through the apparatus during a record operation;

FIG. 7 is a functional block diagram broadly illustrating the signal flow path through the apparatus during a playback operation;

BROAD DESCRIPTION OF THE APPARATUS

Figure 8:
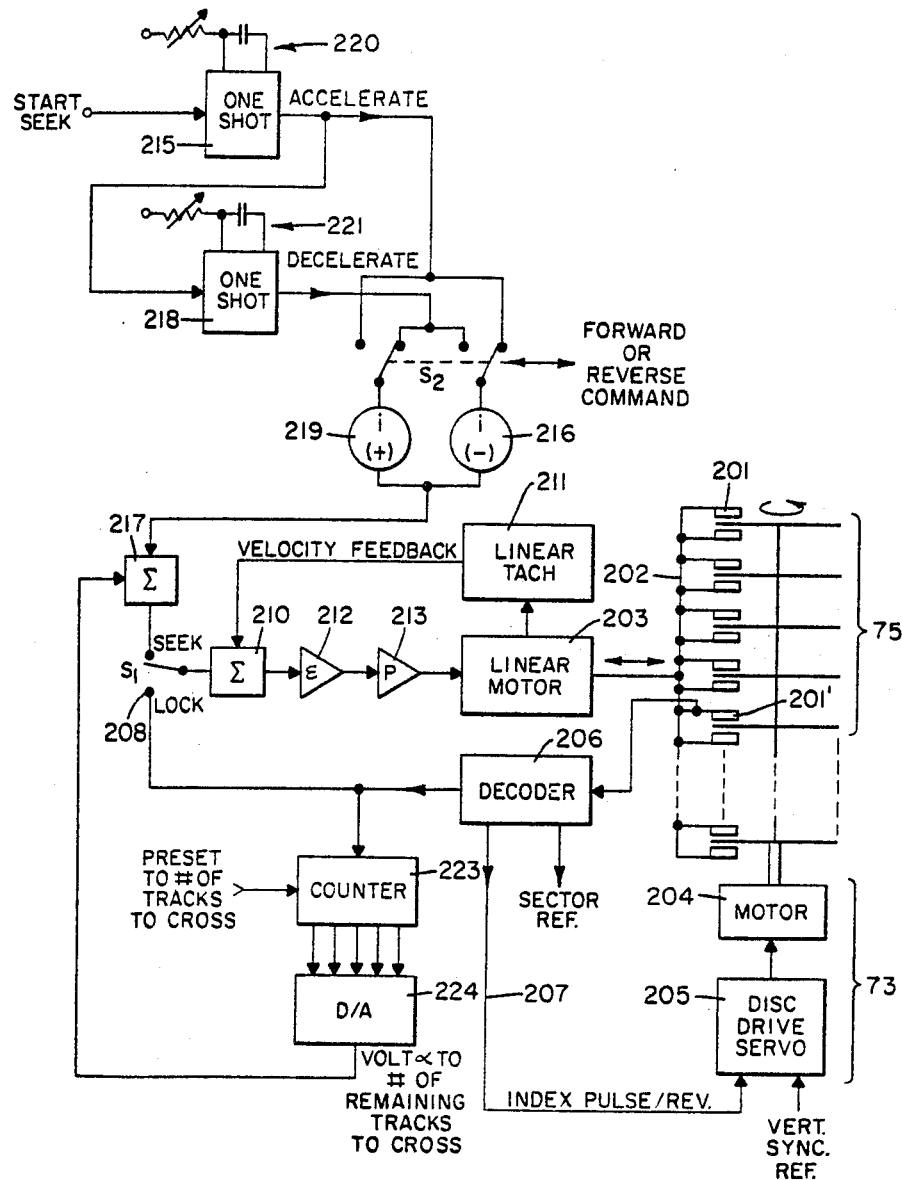
FIG. 8 is a block diagram illustrating the control system that controls the movement of the magnetic recording/reproducing transducers.

Broadly stated and referring to FIGS. 1-3, the present invention is directed to a recording and reproducing apparatus, indicated generally at 70 in FIG. 1 which includes two bays 71 and 72 containing electrical circuitry associated with the apparatus, together with the various monitoring and control hardware shown specifically in the upper portion of the bay 72. The system also includes a pair of disc drives 73 located adjacent the rightward bay 72 with each of the disc drives 73 having a disc pack 75 mounted thereon. While two disc drive units are specifically illustrated in FIG. 1, it should be understood that there may be additional disc drives used with the system to increase the on-line storage capacity of the apparatus. It should also be appreciated that a single disc drive may be used. Operational control of the apparatus is performed by one or more operators using either one of many remote access stations, such as the remote access station 76 shown in FIG. 2A, or an internal access station 78 which is located in the bay 72. If desired, a video monitor 79, vector and "A" oscillioscopes 80 may be provided as shown in bay 72. Phase control switches 81 are provided above the internal access station 78.

The still store and reproduce modes of the apparatus are controlled by an operator using either the internal access station 78 or a remote access station 76, both types of which have a keyboard with numerical and function keys and bars, a 32 character display 82, which provides a readout of information that is needed to carry out functional operations during use, as well as to display the information concerning the identify of certain stills being addressed and other information. It should be understood that the remote access statlon 76 shown in FIG. 2A is representative of each of the remote access stations and that in the preferred embodiment, up to seven remote access stations can be used to control the apparatus 70. The internal access station keyboard indicated generally at 83 in FIG. 1, as shown in the enlarged fragmentary view of FIG. 3, has more expanded operational capability than the remote access stations, whose keyboards have fewer function keys. As will be explained in detail hereinafter, the keyboard contains a large cluster of keys indicated generally at 84 and a smaller cluster of function keys 85 located on the left side of the keyboard. Additionally, a turn key controlled switch 86 may be provided to switch between "normal" and "delete" operations to safeguard against the possibility of inadvertent or unauthorized erasure of actively used stills.

The slow motion and real time modes of operation are controlled by an operator using a slow motion access station 241 of the type shown in FIG. 2B, containing keys, and a continuously variable speed control 242 which allow control of the record and playback rates of the apparatus, setting of cue points which may be accessed whenever desired, and indicators 243 which display to the operator the time used since passing a cue point, the time left until the next cue point, or an absolute time derived directly from the track address of the disc drive.

Referring to the very simplified block diagram shown in FIG. 4, the apparatus receives a video input signal which is processed by record signal processing circuitry 88 and is then applied to record signal interface circuitry 89 which directs the signal to all of the disc drives 73. Gating circuitry located within a selected disc drive 73 is enabled to allow the signal to be recorded on a selected drive. More than one disc drive 73 can be simultaneously selected for recording the video signal provided by the record signal interface circuitry 89. Switcher circuitry can be substituted for the signal splitter and associated gate circuitry so that the signal provided by the record signal processing circuitry 88 is coupled only to selected disc drives having the disc packs 75 upon which the signal is to be recorded. During playback, a signal originating from one of the disc drives is applied to the playback switching circuitry 90 which directs it to one of the playback channels 91, each of which provides a video output channel. A computer control system 92 is interfaced with the record processing circuitry, signal interfacing and switching circuitry and disc drives for controlling the overall operation of the various components of the apparatus and also interfaces the remote access stations 76 and internal access station 78. As will be hereinafter more fully explained, an operator can select a particular disc pack in which to store a still or television video field or sequence of fields, provided that the disc pack 75 is on-line, i.e., it is physically loaded on one of the disc drives 73. In this regard, it should be understood that the apparatus addresses disc packs 75 rather than disc drives for the reason that the apparatus is adapted to identify up to 64 separate disc packs, only one of which can be located on a disc drive at any one time. Thus, in the event the apparatus has two disc drives, only two disc packs can be on-line at one time. The operator can use an access station keyboard 83 to enter the address of a disc pack upon which he wishes to record a television video field or sequence of fields and, through the interaction of the computer with the disc drive on which the selected disc pack is loaded, can carry out the recording operation on the selected on-line disc pack. Similarly, an operator can play back a television field or sequence of fields from the disc pack on one of the disc drives and can define the playback channel that he wishes the field or fields to be played through.

The record and play operations will be initially described, while referring to FIGS. 6 and 7 which illustrate somewhat simplified block diagrams of the signal flow paths during recording and playback, respectively, with respect to one of the disc drives 73.

Turning first to the record signal flow block diagram of FIG. 6, the composite video input signal is applied to the input stage circuitry 93 where clamping of the signal takes place and the synchronization and subcarrier components are stripped from the composite video signal. An NTSC type composite color television signal is shown in FIGS. 5A and 5B. The input stage also regenerates the synchronization (hereafter often referred to merely as "sync") and subcarrier signals for later use during reproduction and, accordingly, the regenerated sync and subcarrier signals are directed to a clock generator 94 which also generates reference signals that are used by the downstream elements during operation. The clamped analog video signal with the color burst component is then applied to an analog-to-digital converter (A/D) 95 which provides an output signal at a sample rate of 10.7 megasamples per second, with each of the samples comprising 8 bits of information. The digital video signal is a non-return to zero code (NRZ) which means that it is a binary code defining a ONE as a high level and a ZERO as an equivalent low level. The digitized video signal appears on 8 parallel lines, i.e., one bit per line, which is applied to an encoder and sync word inserter 96 which converts the digitized video into a special recording code (referred to herein as a Miller code or a Miller squared code) that is particularly suitable for digital magnetic recording in that it minimizes DC content of a data stream. The circuitry also inserts a synchronizing word on alternate television lines with respect to a particular phase angle of the color subcarrier as represented by the color burst sync component. The sync word is used as a reference for correcting time base and skew errors that occur during playback among the eight parallel bits of data that must be combined to define the value represented by each sample. The digital video information in the eight parallel lines is then applied to recording amplifier and head switch circuitry 97 associated with the selected disc drive 73, which switches between two groups of eight recording heads for recording the digitized video signal on the disc drive. The disc drive is servo controlled so that its spindle rotational speed is locked to vertical sync, with the rotational disc speed being 3600 revolutions per minute. By locking the spindle drive to vertical sync, the apparatus records one television field per revolution of the disc pack and simultaneously records the eight data streams on eight disc surfaces. At the completion of recording one field, the head servo circuit more fully described below with regard to FIGS. 8-11, is switched to advance the head carriage radially of the disc pack to adjacent recording tracks for simultaneously recording the second field of a television frame on the next adjacent set of eight disc surfaces so that a full televison frame is recorded on two revolutions of the disc drive, using 8 heads and 16 recording tracks. Each disc pack located on a disc drive preferably contains 814 cylinders (circular recording tracks), each of which has 19 recording surfaces used to store 1628 digital television fields. There is one read/write head for each of the 19 disc recording surfaces of a disc pack and all heads are mounted vertically aligned on the common head carriage whose position is controlled by a linear motor. It should be understood that a cylinder (track) is defined to comprise all recording surfaces that are located on the same radius of a disc pack. However, the term track, rather than cylinder, is preferred herein and, accordingly, a track is meant to include all recording surfaces on a same radius, i.e., all surfaces on a cylinder. Thus an addressed track for recording or playing back a video field actually refers to the 19 individual surfaces on the cylinder available at that radius. of the 19 surfaces that are available for recording, one is used to record the address and other housekeeping informatfon, rather than active video information, and it is specifically referred to as the "data track". Two of the 19 surfaces are available for recording a parity bit and 16 surfaces, 8 on the top and 8 on the bottom surface of each disc, are used to record the video data. The television video field signals are recorded consecutively on one side of the discs until the top surface tracks are all filled and then the recording amplifier and head switch circuitry 97 is commanded to activate the bottom set of 8 heads and the head carriage servo circuit switched to reverse the radial direction of the heads for consecutively recording the next 814 video field signals. This format of video field recording sequence allows continuous recording and playback without having to interrupt the recorded signal while the head carriage assembly is returned from the inside track to the outside track or vice versa.

Also, one of the heads, generally referred to as the servo head, travels on the 20th disc pack surface that contains only servo track information prerecorded by the pack manufacturer. The servo tracks carry out two functions, i.e., following a seek command the servo head traverses servo tracks that are counted to determine the instantaneous location of the head and, after completion of a seek phase, the servo head generates an error signal that is used to control the linear motor position to hold the head carriage centered on the appropriate servo track. By using such a feedback system, it is possible to achieve a radial packing density of about 400 tracks per inch or a total of 814 tracks per disc pack.

Since the present apparatus does not record analog video signals because of frequency response limitations of computer disc pack memories, the video signal is digitized for recording. Because the digitized signal is recorded, the video signal to noise ratio of the system is primarily determined by quantization noise rather than recording media and preamplifier noise as is the case with conventional videotape recorders. Thus, the present apparatus delivers a signal to noise ratio of about 58 dB and effects such as "moire" and residual time base error do not exist, the digital random error of the storage channels being typically low enough to make occasional transmission errors virtually invisible.

By recording a digital data stream at a rate of 10.7 megabits per second on each of the eight disc surfaces, the linear packing density of the apparatus is about 6000 bits per inch which is about 60% greater than is used in conventional disc drive usage in data processing.

During Playback and referred to FIG. 7, the heads read, i.e., reproduce the digital video information from the eight surfaces per field and obtain the recorded channel encoded digital video signal from the odd and even fields. The produced signal is applied to a playback amplifier and head switch circuitry 98 associated with the selected disc drive 73, which amplifies the data streams of digital video information carrier by the eight data bit lines and applies the same to equalizer and data detector circuits 99. The equalizer compensates for phase and amplitude distortion introduced to the signal by the band limiting effects of the record and reproduce processes and insures that the zero crossings of the reproduced signal are distinct and accurately positioned. Following equalization, the channel encoded signals in each data bit line are processed for transmission to the playback circuitry of the signal system over a twisted pair line. The processed channel encoded signals are in the form of a pulse for each zero crossing or signal state transition of the channel encoded signal. The twisted pair lines for the eight data bits of the digital video information apply the processed channel encoded signals to the decoder and time base corrector circuitry 100 of one or more of the playback channels 91 of the apparatus. The decoder and time base corrector circuitry 100 reprocesses the received signals to place them in the channel encoded format, decodes the signal to the non-return to zero digital form and time base corrects the digital signal with respect to station reference to remove inter-data bit line time displacement errors (commonly referred to as skew errors) and timing distortion within each of the data streams carried by the data bit lines. Thus, the time base corrector portion of the circuitry 100 serves to align the eight bits defining a single sample and remove timing distortion in each of the data bit lines relative to station reference. It should be realized that each playback channel 91 is provided with decoder and time base corrector circuitry 100 and within each playback channel each of the eight data bit streams travels through a separate decoder and time base corrector. The output of the circuitry 100 is then applied to a comb filter and chroma inverter 101. The inverter 101 separates the chroma information and selectively inverts and recombines the signal for reconstruction of a four field NTSC sequence. This reconstructed digital signal is applied to a digital-to-analog converter 102 which provides an analog video signal. The new sync and burst are then added by a process amplifier 103 to produce a composite video analog output signal of the playback channel 91 as is desired. Exemplary apparatus for recording and reproducing digitized television signals as described above with reference to FIGS. 1, 2A and 3-7 and which is suited for use in the present invention is described in the above-identified related application, Ser. No. 763,371.

DESCRIPTION OF THE HEAD SERVO CIRCUIT

Referring now to FIGS. 8-11 there is shown the improved magnetic recording head servo circuit portion of the present invention which permits continuous recording of consequtive television field signals on a real time basis, i.e., at 30 frames/second. More particularly, the magnetic recording/reproduction heads 201 are carried by a common head carriage assembly 202 driven radially of the disc pack 75 via a linear motor 203. The discs are driven at a constant angular velocity, i.e., 3600 RPM via motor 204 under the control of a disc drive servo controller 205. The servo controller 205 compares the timing of a reference vertical sync input signal from the clock generator 94 with an index input signal derived from the servo recording track on the disc pack 75 to control the angular velocity of the discs. The servo control signal is played back from the servo track by means of a servo control playback head 201'. This signal is decoded by decoder 206 and outputted at 207 to disc drive servo 205.

Also the transducer heads 201 are maintained on the recording tracks by means of signals recorded on the servo track and picked up by servo head 201'. Such a track servo is disclosed in U.S. Pat. No. 3,534,344, issued Oct. 13, 1970. These track control error signals are outputted from the decoder 206 to the servo control loop lock terminal 208 of switch S1. When S1 is in the "lock" position, the error signals are fed to an adder 210 for adding with a velocity feedback signal derived from a linear tachometer 211 coupled to the linear motor 203 for a velocity feedback signal phase lead compensation of the servo loop. The compensated error signal output of adder 210 is amplified by error amplifier 212 and thence by power amplifier 213 to derive the drive signal for the linear motor 203.

When the television field signal reaches a point near the end of the particular field signal being recorded, as sensed from sector signals recorded on the servo track and as picked up by the servo head 201' and inputted to the computer 92 from the decoder 206, the computer 92 commands the head servo circuit of FIG. 8 to start "seek" for the adjacent recording track. If the recording or playback is in the forward direction, i.e., a video field sequence 1, 2, 3, 4, .. n, the computer 92 commands a "forward" input to switch S2 for switching the output of the accelerate one shot 215 to first actuate a current source 216 of a first polarity the output of which is fed to a second adder 217 and thence via switch S1, into the linear motor for accelerating the carriage 202 and transducer heads 201 radially of the discs toward the next adjacent recording tracks. The accelerate one shot 215 provides a pulse output of approximately 680 microseconds duration, and the trailing edge of the "accelerate" pulse triggers firing of a "declerate" one shot 218 which produces an output pulse of approximately the same duration as the "accelerate" pulse. The declerate pulse is applied via switch S2 to energize a current source 219 of opposite sign which is thence fed to the linear motor 203 via the previous path for rapidly decelerating the carriage 202 and transducer heads 201 over the next adjacent recording track. The amplitudes of the currents derived from sources 216 and 219 are sufficient to saturate the drive coils of the linear motor 203 so as to obtain the fastest possible acceleration and deceleration of the transducer heads 201 during the track change interval, which occurs during to the vertical interval of the television video field signal. The pulse widths of the one shots 215 and 218 are controlled by RC time constant control circuit 220 and 221, respectively, associated with each of the one shots 215 and 218. By adjusting the time constants of these circuits 220 and 221, the acceleration and deceleration of the heads 201 can be adjusted so the heads 201 are braked to a stop very nearly on the next adjacent track being sought.

In case the heads 201 are to be incremented to a track which is not adjacent their present track, the operator through keyboard 241 causes the computer 92 to preset into counter 223 the number of tracks to be crossed in transiting the heads to the new track. The output of the decoder 206 feeds a track counting input into the counter 223 which decrements the count output to a digital-to-analog converter 224 for producing an analog output voltage proportional to the number of remaining tracks to be crossed. This output is fed via adder 217 and seek switch S1 to the drive circuit of the linear motor 203. When the last track is reached, the output of the D-to-A converter 224 drops to zero amplitude and the computer 92 commands switch S1 to switch to the "lock" position 208, for closed loop servo control lock of the linear drive motor onto the desired track.

Thus, the prior art ESS-1 system has been modified in two ways to provide real time television video field recording and playback from a single disc pack. The first modification was to alter the prior art track format from recording the first field of a video frame on one side of the disc and the second field on the opposite side at the same radial track location to a format which records consecutive fields on consecutive tracks on the same side of the disc until the end of the tracks is reached, whereupon the recording is switched by the computer to the opposite side of the disc with consecutive fields being recorded in the opposite radial direction, i.e., "in on the top, and out on the bottom" format. This permits continuous recording without loss of fields.

The second modification to the ESS-1 prior art system was the provision of the head servo drive circuit which provided both acceleration and deceleration drive for the linear motor 203 which drives the head carriage 2 and transducer heads 201. This permitted change of recording tracks during the vertical interval of the television field signal on a real time basis, i.e., at 30 frames per second.

Figure 9:
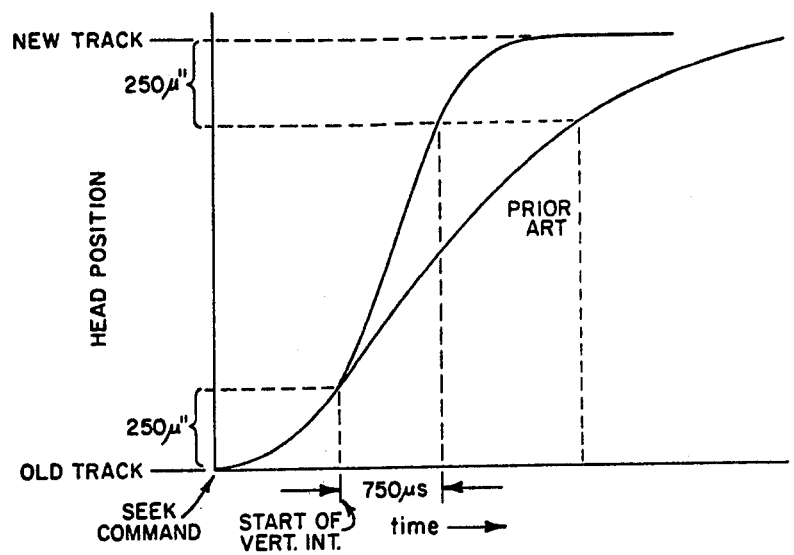
FIG. 9 is a plot of magnetic recording head radial position versus time depicting movement of the head from one recording track to the adjacent recording track.
Figure 10:
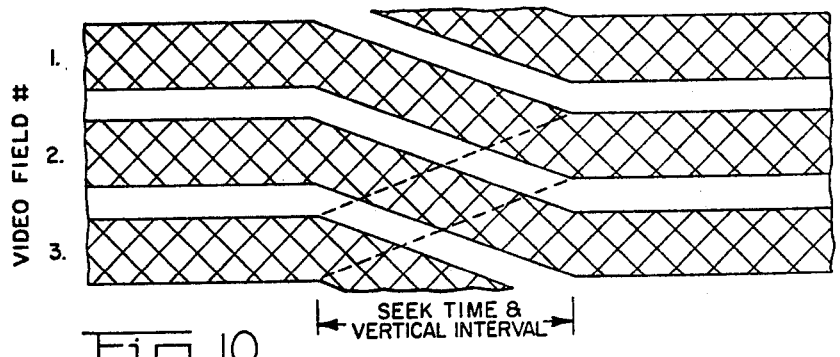
FIG. 10 is a fragmentary enlarged plan view of three adjacent recording tracks on a magnetic recording disc.
Figure 11:
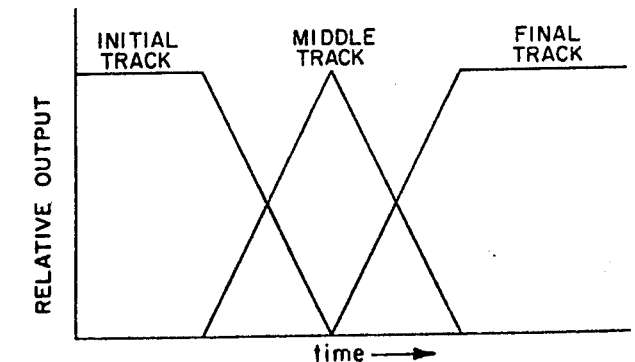
FIG. 11 is a plot of relative output signal amplitude derived from the playback transducer while transversing from one recording track to the next adjacent track when the system is playing back in the reverse motion mode, as indicated by the doted lines of FIG. 10.

Referring now to FIGS. 9–11, the transducer head transition between adjacent tracks in the modified system will be described in greater detail. FIG. 9 shows head position versus time for the aforementioned head transition. In the head servo circuit of FIG. 8, up to 500 microinches of mistracking may be permitted recording before errors appears in the video picture. Taking ½ of this figure for safety, i.e., 250 microinches, it is found that the actual mistracking time, as depicted by curve 249, is only about 750 microseconds when using the modifications of the present invention. However, in the prior art unmodified system the head motion is depicted by curve 250 and the mistracking time very nearly equals or exceeds the vertical interval of 1.3 microseconds, thus resultin in interruption of the video picture. By starting the "seek" early, before the vertical interval, the mistracking is made to occur entirely within the vertical interval. The sector counter in the disc drive provides a software controlled start of seek position to achieve this result.

The recording/reproduction current to and from the transducer heads 201 is left on continuously, even through the vertical interval. when playing back in the same direction as the recording was made, i.e., forward action, and in real time, there is no discontinuity of the head signal during the vertical interval because the head 201 tracks the same path as it did during the continuous recording. Thus, there is no loss of word sync, i.e., lock up to the video time base signals inserted into every other line of the recorded video signal. However, when playing back still play or worse when playing back reverse action, i.e., field sequence 4, 3, 2, 1, etc., the head crosses an extra track, see FIGS. 10 and 11, before landing on the desired track. The head output at any instant of time during the seek will be of combination of the signals derived from which ever tracks are under the head 201 at that instant, so the relative outputs of the three tracks will be approximately shown in FIG. 11. The signal received by the time base correcting circuit, must be clean enough during the vertical interval to be certain of acquiring word sync lock before the start of the picture data and the active picture area must be error free. In order to meet the second of these conditions, the seek time must fit within the vertical interval of 1.3 milliseconds, which it does, see FIG. 9.

With regard to word sync lock up, the recorded tracks being crossed contain recorded black data within the vertical intervals. As described in the above-identified related application, Ser. No. 763,371, block data is inserted within the vertical interval (other than at locations of the sync words) as binary "0" bits. Black data in Miller 2 code corresponds to a symmetrical sequare wave, which is in reality a sine wave due to system bandwidth limitations. The data on adjacent tracks during the vertical interval will consist of sine waves with unknown but slowly changing phase relationships. Any mixture of two such tracks is also a sine wave of the same frequency, with slowly changing phase and amplitude, i.e., black+black=black. No comparable statement may be made for the region of active video data. Thus, while no adjacent track interference may be allowed during the data period, very large amounts of interference may be permitted during black, subject only to the constraint that the amplitude of the resulting signal not go too low. In practice it is possible to lock the decoder 206 to a sine wave at least 20 dB down with respect to normal amplitude, and this ratio is guaranteed when the final to middle track ratio reaches 55%/45% (or a signal to interference ratio of −1.75 dB). Thus decoder lock is guaranteed just to the right of the middle to final track crossover point of FIG. 11, which leaves adequate margin for word sync lockup prior to active picture data. In fact, about 90% of the time the decoders pass through the entire vertical interval without loosing lock. Lock is lost only if the random phase between two tracks is close to 180 degrees.

COMPUTER PROGRAM

The central processing unit is preferably a microprocessor or microcomputer and, in the apparatus described herein, it comprises our LSI-11 system made by the Digital Equipment Corporation of Maynard, Massachusetts. More specifically the apparatus of the present invention incorporates as the CPU a model KD11-F microcomputer type LSI-11 system which contains a microprocessor and a 4 k by 16 bit semiconductor read/write memory.

The slow motion-real time mode access station (keyboard) 241 accesses the CPU and the load module for the slow motion program is as follows:

```
BLOCK NUMBER 00000
000/  000001 000054 100000 000137 102510 122701 000016 001002
020/  000137 102014 122701 000015 001002 000137 100500 122701
040/  000013 001002 000137 100060 022701 000377 000700 026000
060/  023000 001200 057402 077000 057600 063000 163221 020025
100/  001204 003012 140611 036027 157605 025011 163221 135025
120/  001221 003012 005611 140611 132425 000001 000054 100114
140/  102476 010125 113715 110652 152725 000100 112725 000061
160/  112725 000061 013701 102476 105001 000301 010102 042702
200/  000300 012737 000177 000655 026000 071000 042200 163205
220/  042025 003205 057611 063000 003621 000611 003035 001000
240/  057402 063000 057621 036040 002605 163203 014025 141204
260/  014425 011000 000001 000054 100230 104406 010102 006301
300/  006301 060201 006301 010102 006301 060201 012702 110714
320/  012703 000011 005022 005303 001375 005002 012703 000001
340/  000660 026000 137000 171200 105013 001604 071003 105040
360/  003204 151203 101413 141412 002045 172400 003002 071001
400/  105020 157604 146020 057621 011000 001201 026412 000001
420/  000054 100344 012703 000001 005004 012705 110714 005762
440/  102212 001406 010325 020162 102212 101407 166201 102212
460/  005722 005203 022703 000004 001362 000551 026000 005000
500/  071201 105020 057604 011000 157601 001425 043000 140605
520/  146025 141221 102025 141604 154025 142221 105025 142604
540/  151025 144621 003013 130003 000001 000054 100460 012223
560/  012425 005721 005337 102506 001370 000137 110546 012737
600/  000001 110744 005037 110642 005037 102474 005037 110644
620/  005037 110646 000403 026000 053000 140601 146025 141621
640/  004425 010400 141412 176412 163002 061025 001204 003012
660/  157611 131011 001204 057606 063000 157621 000425 167000
700/  012621 000001 000054 100574 012737 000001 113014 004737
720/  106160 103412 012704 102000 004737 110234 103405 013703
740/  177544 032703 000010 001421 004737 110370 004737 000444
760/  026000 121000 022201 157605 000025 060000 117777 162012
BLOCK NUMBER 00001
000/  157621 002045 162000 160221 017402 006012 057626 005000
020/  141203 001425 140400 125027 057621 022020 000001 000054
040/  100710 000114 013703 110744 005301 001405 006302 006302
060/  006303 006303 000771 050237 000110 040337 000110 013737
100/  000110 177574 013701 110744 000504 026000 167000 140601
120/  040414 071034 000400 140612 057400 047020 017400 131012
140/  017621 130012 017621 166012 141221 166027 157621 166027
160/  050221 013000 105611 000001 000042 101024 005737 000126
200/  001422 023737 110662 110644 103406 013737 110660 110642
220/  013737 110662 110644 013737 000431 020000 030000 166202
240/  130221 117621 130012 017621 131012 001221 117401 131012
260/  117621 166012 157621 027045 147403 000001 000034 101112
300/  110754 001335 023737 110662 110644 103406 013737 110660
320/  110642 013737 110662 000415 022000 060000 122202 157621
340/  121013 002221 117402 121012 157621 122012 157621 000465
360/  121000 002221 117403 121012 157621 111412 000001 000054
400/  101176 110644 032737 000001 110644 001402 005337 110644
```

```
420/ 012737 000000 177540 013701 110644 022701 000036 101003
440/ 162701 000036 000772 160137 000512 026000 122000 122202
460/ 140621 122027 141221 162027 141221 141014 001345 071000
500/ 105020 171204 121027 102221 017604 136012 140621 017045
520/ 003400 117602 023012 000001 000054 101312 102474 005237
540/ 110674 162701 000036 000766 013701 110674 004737 110452
560/ 012746 110670 062716 000002 012702 000004 013701 110744
600/ 005301 000741 026000 170000 001602 141003 004145 175400
620/ 003001 157611 001445 162000 002221 117403 162012 057621
640/ 073000 140601 036027 157605 025011 163221 135025 024221
660/ 000001 000054 101426 012702 000036 104406 000137 110546
700/ 032702 000001 001402 005237 110640 013701 110666 006301
720/ 162701 000002 013761 110640 110676 013737 000567 026000
740/ 036000 132203 047221 141000 120027 117621 050020 013000
760/ 157611 053013 000400 044403 157401 000125 047200 140400
BLOCK NUMBER 00002
000/ 010025 001000 141412 047025 030400 000001 000054 101542
020/ 012704 000004 112305 042705 177400 060502 010237 177500
040/ 062702 000400 105002 005301 001403 005304 001757 000762
060/ 105002 152702 000015 000666 026000 104000 117603 040020
100/ 140777 000025 141001 133027 141221 001012 140403 176014
120/ 140401 021125 057400 041020 142377 100025 001612 002211
140/ 142211 105425 000001 000054 101656 105400 104403 013703
160/ 177544 032703 000010 001373 104404 052704 000001 104403
200/ 104404 042704 000001 104403 013703 177544 032703 000001
220/ 000705 026000 152000 175603 002002 117611 120012 157621
240/ 027445 120003 125621 157402 000025 060000 157777 120012
260/ 140621 120027 140621 000465 000400 140403 144012 000001
300/ 000053 101772 013702 110666 006302 162702 000002 010162
320/ 110704 000137 110546 012746 102102 005002 104406 000137
340/ 110546 047524 041040 043511 046000 000001 000047 102040
360/ 030060 051440 041505 020123 053101 044501 020114 047040
400/ 042505 026504 020040 020040 020040 020040 020040 020040
420/ 170000 000001 000054 102102 047111 027121 044475 044516
440/ 027124 020040 042522 036503 042504 027514 047105 044453
460/ 044516 044524 052101 000105 053104 026461 030060 000620
500/ 020400 064000 020204 042040 031126 030055 020060 042040
520/ 031526 030055 020060 052040 052117 046101 030040 000060
540/ 000573 026000 102000 000204 000000 000000 000000 000000
560/ 000000 020000 020040 047516 041440 040510 047116 046105
600/ 020040 020040 020040 020040 020040 020040 012440 000001
620/ 000015 102252 020040 020040 020040 002000 000001 000054
640/ 102262 012701 000020 012737 000002 110652 000207 000240
660/ 103426 012701 000010 012737 000001 110652 004737 102362
700/ 103416 012701 000040 012737 000727 026000 154000 001604
720/ 125000 157621 171011 003204 163207 110025 001204 003012
740/ 130611 103400 120400 103400 070000 064260 004000 001002
760/ 071012 064260 016000 000001 000054 102376 001006 005202
BLOCK NUMBER 00003
000/ 122702 000011 001371 000261 000207 000241 000207 013702
020/ 110744 012701 000001 005302 001401 006301 004737 102362
040/ 000207 000513 026000 022000 103605 142000 004025 157611
060/ 116011 140620 000025 140600 177012 157402 174011 103620
100/ 000000 002400 003324 177425 000000 000000 140400 012105
120/ 000001 000054 102512 177600 013702 113000 110122 022702
140/ 117000 101002 012702 112760 010237 113000 122701 000022
```

```
160/ 001002 000137 112262 122701 000023 001002 000754 026000 *
200/ 070000 057605 142000 140605 005445 001000 057606 063000 *
220/ 157621 000125 045200 157400 045027 077000 057777 021220 *
240/ 140615 074414 112000 063205 134221 000001 000022 102626 *
260/ 110546 110546 104000 104010 104416 104654 000400 017000 *
300/ 121000 142205 126212 063205 022221 026213 157613 076011 *
320/ 057624 142000 140605 015227 117615 113012 000001 000054 *
340/ 102672 106432 005037 106440 000137 102510 005037 106400 *
360/ 005037 106402 013701 177572 012737 000003 102506 012701 *
400/ 110714 012702 102204 012703 000600 026000 160000 154205 *
420/ 142221 105025 142604 151025 144621 003013 111403 012424 *
440/ 150425 157413 043012 174205 157402 131011 000604 141012 *
460/ 001425 041400 143634 000001 000054 103006 110714 013704 *
500/ 110652 005304 001405 006302 006302 006303 006303 000771 *
520/ 050237 000110 040337 000110 113737 110714 000147 112737 *
540/ 000001 000575 026000 026000 063206 000400 002012 042012 *
560/ 146234 025221 157403 077011 016214 142207 001425 157611 *
600/ 116011 013620 157607 174011 157620 022011 142205 131025 *
620/ 000001 000054 103122 105420 004737 110234 103416 004737 *
640/ 110370 012704 105502 004737 110234 103407 004737 110370 *
660/ 012704 104404 004737 110234 103400 004737 000646 026000 *I
700/ 074000 174206 002220 017412 060021 042377 146034 157621 *
720/ 110011 150612 151413 141001 101025 141000 062127 117400
740/ 066020 017777 036012 140605 110425 000001 000054 103236
760/ 110722 012705 000001 005037 106374 005037 106376 005002
BLOCK NUMBER 00004
000/ 006311 001417 061137 102474 005737 106374 001005 005311
020/ 005237 106374 005237 000562 026000 142000 177206 141214
040/ 036027 141205 072412 000221 157615 011011 150607 102413
060/ 142412 002045 163400 141002 036027 157605 011011 141207
100/ 177027 142614 000001 000054 103352 004737 103444 012701
120/ 000106 012702 112650 112203 042703 177400 053703 000144
140/ 005737 177556 100775 010337 177554 005301 001364 000137
160/ 000665 025000 010000 063207 141621 062027 101400 157720
200/ 067013 176777 157601 066020 141377 001400 101612 157720
220/ 067013 176777 157601 066020 103777 027400 000001 000054
240/ 104000 005037 110756 000137 104016 012737 000001 110756
260/ 012702 000002 004737 105572 103435 004737 105756 005737
300/ 110756 001003 010237 106464 000621 026000 023000 001210
320/ 117401 162020 141221 141014 001345 101000 154034 041221
340/ 117540 166020 157621 070011 004214 157607 000011 002616
360/ 157607 173011 147221 000001 000054 104114 005737 106466
400/ 001002 000137 110546 005737 106454 001006 005737 106460
420/ 001770 005237 106454 000765 005037 106454 005037 106460
440/ 013701 000663 026000 071000 027210 001215 071012 146240
460/ 003221 151003 141013 003045 000400 000002 173400 151001
500/ 171013 146013 002221 117403 146034 031221 004615 133001
520/ 000001 000054 104230 013737 110714 106462 023737 106456
540/ 106462 001002 000137 110546 013704 106456 105064 106406
560/ 052704 101400 004737 110234 103442 004737 000637 026000
600/ 137000 174210 142220 004025 157612 116011 015620 157607
620/ 174011 157620 000025 060000 142377 031027 017615 027021
640/ 032215 003221 157615 077011 051214 000001 000054 104344
660/ 103415 004737 110370 012704 105044 004737 110234 103406
700/ 004737 110370 012704 105401 004737 110234 004737 110370
720/ 012737 000000 177540 000617 026000 005000 057611 063000
```

```
740/ 157621 000425 167000 157621 127011 017612 030012 157615
760/ 070011 037214 142207 000025 157613 116011 034620 141607
BLOCK NUMBER 00005
000/ 062027 051377 000001 000054 104460 004737 110370 032703
020/ 000200 001441 012704 105604 004737 110234 103455 012702
040/ 140000 005302 001006 012737 000012 112056 004737 112000
060/ 000667 026000 053000 021611 141401 062027 141777 001065
100/ 171400 141402 062027 141777 001065 175400 141403 162027
120/ 171621 003220 157615 027020 157615 174011 170220 000001
140/ 000054 104574 012704 105044 004737 110234 103414 004737
160/ 110370 012704 105401 004737 110234 012737 000001 106466
200/ 013737 110744 106456 004737 110370 000551 026000 121000
220/ 157611 000025 060000 057777 063000 017621 033012 141215
240/ 146025 145221 005413 141002 115025 141000 062127 157400
260/ 067013 176777 117601 105420 000001 000054 104710 177554
300/ 000137 110546 012204 105064 106406 010246 004737 106176
320/ 103425 004737 110370 012704 105400 004737 110234 103416
340/ 013703 177544 000732 026000 167000 157611 174011 141620
360/ 000465 007000 141402 002065 003000 142002 041125 157400
400/ 116011 157620 174011 157620 000025 060000 101377 150025
420/ 042401 000001 000054 105024 032737 000001 112530 001006
440/ 005737 000206 001410 004737 105160 000405 005737 000206
460/ 001002 004737 105160 012704 105502 004737 110234 000670
500/ 026000 035000 162612 157607 174011 157620 070011 142212
520/ 004025 157612 116011 156220 157607 174011 142220 000025
540/ 157613 116011 152620 141607 062027 167377 000001 000054
560/ 105140 032703 000001 001373 004737 110370 005037 106456
600/ 000715 013703 177572 032703 020000 001373 013703 177572
620/ 032703 020000 001773 000207 000571 026000 103000 157612
640/ 120011 057612 045121 002000 157401 120011 057612 045101
660/ 157400 045027 077000 103777 142400 100025 142400 142014
700/ 176412 103402 171400 000001 000054 105254 000207 052737
720/ 000007 000112 042737 000003 000112 013737 000112 177576
740/ 000207 000207 012701 110714 005711 001440 011104 004737
760/ 106176 000743 026000 151000 012612 142207 000025 157613
BLOCK NUMBER 00006
000/ 116011 010220 141607 062027 157777 174011 030620 116212
020/ 141615 100065 003400 170403 000725 116000 142215 170025
040/ 000001 000054 105370 105604 004737 110234 004737 110370
060/ 012737 000000 177540 005721 000736 004737 106470 103407
100/ 012701 000232 005737 177556 100775 010137 000701 026000
120/ 017000 066213 057777 063000 017621 167012 057621 031000
140/ 157613 000425 167000 141221 001025 157400 075011 140613
160/ 054025 057625 162224 017621 013412 000001 000054 105504
200/ 110754 111137 110754 005737 110756 001014 023737 110744
220/ 110762 001002 000137 110546 012702 000214 053702 000144
240/ 010237 177554 004737 000550 026000 065000 070213 001214
260/ 057606 063000 157621 000011 057616 063000 141621 054025
300/ 005625 031412 001012 031400 002012 142000 000025 142010
320/ 120012 107400 000001 000054 105620 005737 177546 100373
340/ 013701 177546 010037 177546 010123 005013 005302 001361
360/ 010037 177570 012703 112530 032723 070000 001026 032723
400/ 000743 026000 133000 000213 011560 145402 000065 010160
420/ 171402 177234 176777 171777 177222 031777 177612 005777
440/ 103412 157400 002425 027000 157624 000011 171624 000001
460/ 000046 105734 000137 110546 012737 000006 112056 004737
```

```
500/  112000  000137  110546  012737  000001  110742  005737  110756
520/  001411  005037  000610  026000  176000  174213  157621  054047
540/  122225  001615  157602  000425  174000  017621  176012  001214
560/  140412  054027  057625  036040  003605  157603  004425  027000
600/  110624  000001  000054  106042  004737  112000  000137  110546
620/  026201  110722  103006  166201  110722  005722  005237  106374
640/  000767  016203  110722  005737  106374  001402  005301  000635
660/  026000  044000  141614  041412  041740  003040  017607  161012
700/  140621  001020  117402  030012  141215  001145  101000  157414
720/  167013  001621  157403  054027  122225  007215  000001  000054
740/  106156  000207  013704  110744  005737  110756  001002  013704
760/  106464  052704  101400  004737  110234  103002  000261  000207
BLOCK NUMBER 00007
000/  004737  110370  005103  042703  000704  026000  112000  140214
020/  142000  176105  172377  172240  003614  157403  004025  027000
040/  157624  072011  130621  103400  142000  000025  157604  116011
060/  175220  141607  021027  000001  000054  106272  177544  032703
100/  000010  001406  012737  000003  112056  004737  110564  000207
120/  005002  013703  177544  032703  000020  001411  005302  001371
140/  012737  000734  026000  160000  002214  027000  157624  072011
160/  130621  103400  157400  174011  120620  103400  003400  012443
200/  007061  016052  000070  000000  000000  000000  000000  164000
220/  000001  000054  106406  000000  000000  000000  000000  000000
240/  000000  000000  000000  000000  000000  106416  106416  000000
260/  000000  000000  004737  112174  000137  000000  000663  026000
300/  026000  000215  000000  000000  000000  000000  000000  140400
320/  146025  144621  000413  103402  170400  116213  001215  150402
340/  174013  042001  157424  077011  140614  000001  000054  106522
360/  012704  105400  004737  110234  005002  012705  000005  005302
400/  001002  005305  001405  013703  177544  032703  000002  001767
420/  012702  140000  005302  000526  026000  074000  177215  142402
440/  002425  141000  001012  142402  000012  141402  062027  141777
460/  001065  173400  157403  174011  157620  000025  060000  150377
500/  000001  104400  000001  000016  106636  000000  000000  000000
520/  000000  000706  026000  000000  017616  172012  157621  167013
540/  003621  157403  162047  171221  006221  117403  172012  004621
560/  157401  032047  171215  002621  157402  000025  060000  035777
600/  000001  000054  107046  000261  000207  012704  104401  004737
620/  110234  103772  004737  110370  012704  102404  004737  110234
640/  103763  013703  177544  005103  042703  177400  000776  026000
660/  046000  157616  163020  157621  174011  142220  004025  157605
700/  116011  000620  103606  141400  062027  041777  157412  174011
720/  141620  117505  141777  141414  056414  000001  000054  107162
740/  006303  060337  110746  005037  110750  013702  110754  013703
760/  110746  160302  100004  052737  000200  110750  005402  010237
BLOCK NUMBER 00010
000/  110752  001002  000137  000430  026000  114000  150216  142217
020/  166027  142221  000105  142377  000125  157606  116011  154620
040/  157607  174011  142220  166027  142221  177505  102374  102014
060/  102014  057414  000001  000054  107276  052704  103400  004737
100/  110234  103713  004737  110370  013704  110752  042704  177400
120/  052704  104000  004737  110234  103700  004737  110370  013704
140/  000554  026000  162000  165216  142221  142000  176105  142377
160/  000125  142217  164127  157621  116011  131220  157607  174011
200/  142220  075425  157601  174013  001221  142003  177425  000001
220/  000054  107412  100572  004737  110234  103646  004737  110370
```

```
240/ 005737 110756 001453 022737 000001 110752 001447 012704
260/ 105400 004737 110234 103473 013703 000471 026000 030000
300/ 062217 157777 174011 141620 000465 011000 142003 004025
320/ 157612 116011 157620 174011 142220 000025 157613 116011
340/ 024620 141607 062027 157777 000001 000054 107526 032703
360/ 000001 001373 004737 110370 012737 000001 110760 042737
400/ 000200 000110 013737 000110 177574 005737 110750 001016
420/ 013704 110752 000644 026000 076000 142217 163147 142221
440/ 027045 010003 157606 000425 027000 157624 072011 000621
460/ 103606 157400 165047 163221 002621 157603 000425 027000
500/ 106624 000001 000054 107642 103001 000207 012704 105420
520/ 004737 110234 103772 004737 110370 012704 104420 004737
540/ 110234 103763 004737 110370 042704 000020 004737 000652
560/ 026000 144000 116217 166220 157607 174011 157620 161027
600/ 063221 142000 162027 142221 017400 063121 157400 167013
620/ 036221 157403 000125 044200 157400 176065 000001 000054
640/ 107756 000001 112530 001003 042737 100000 000110 013737
660/ 000110 177574 052737 000014 000110 013704 110744 006304
700/ 006304 040437 000110 013737 000650 026000 012000 044220
720/ 076000 157777 162027 171221 157621 170013 016621 017403
740/ 170012 141221 000025 142200 000025 157611 116011 031220
760/ 141207 002412 167403 000001 000054 110072 013703 177544
BLOCK NUMBER 00011
000/ 032703 000020 001771 013703 177544 032703 000020 001373
020/ 004737 110370 052737 000200 000110 013737 000110 177574
040/ 012704 000610 026000 060000 000620 157611 116011 014620
060/ 157607 174011 157620 000025 060000 140777 115025 140400
100/ 062127 057400 066020 157777 172013 004221 141003 145425
120/ 000001 000054 110206 000220 153702 110744 053702 000144
140/ 010237 177554 013737 000110 177574 000207 010437 177540
160/ 052704 010000 010437 177540 000240 000240 000701 026000
200/ 126000 141620 061027 003777 157600 003425 027000 157624
220/ 072011 130621 103400 141400 000065 004001 157402 001025
240/ 027000 157624 072011 130621 115000 000001 000054 110322
260/ 000207 000400 000241 000207 010437 177540 052704 010000
300/ 010437 177540 000207 010437 177540 052704 010000 010437
320/ 177540 000240 000240 000554 026000 174000 142220 000105
340/ 017420 060021 103777 153000 157413 000025 060000 057777
360/ 063000 002221 002412 041412 141624 170105 002777 142421
400/ 142414 167414 000001 000054 110436 060504 006304 060304
420/ 005302 001365 000207 012702 110670 012712 030060 012762
440/ 030060 000002 005062 000004 012705 001750 004737 110530
460/ 000643 026000 042000 142621 062025 157400 054011 142621
500/ 005025 157400 054011 045221 103720 040400 001341 105201
520/ 176212 040401 151141 103613 102400 102025 025025 000001
540/ 000054 110552 012603 012602 012601 012600 000002 004737
560/ 112000 004737 112060 004737 110370 012737 000000 177540
600/ 000207 000137 110546 000000 000000 000664 026000 110000
620/ 000221 000000 000000 000000 000000 000000 000000 000000
640/ 000000 000000 000000 000000 000000 000000 000000 000000
660/ 000000 000000 000000 131000 000001 000054 110666 000000
700/ 000000 000000 000000 000000 000000 000000 000000 000000
720/ 000000 000000 000000 000000 000000 000000 000000 000000
740/ 000000 000000 000614 022000 156000 000221 000000 000000
760/ 000000 000000 000000 000000 000000 000000 000000 000000
```

BLOCK NUMBER 00012
```
000/ 000000 000000 103400 000000 163400 000001 000054 112000
020/ 005737 113014 001401 000207 012701 000211 053701 000144
040/ 005737 177556 100775 010137 177554 013701 112056 053701
060/ 000144 005737 177556 000461 026000 023000 176624 057601
100/ 066020 103777 000000 157400 006013 000626 103403 163000
120/ 055025 001224 017412 054020 140224 004025 003000 163211
140/ 027025 165224 000001 000054 112114 012702 000023 104406
160/ 013700 112130 000207 000000 020040 020040 020040 046123
200/ 026517 047515 042440 051122 051117 020040 020040 020040
220/ 000517 007400 071000 020224 020040 020040 020040 000040
240/ 000752 026000 076000 140624 124025 157625 000625 174000
260/ 141625 005025 142000 174025 157625 005245 174000 001625
300/ 157402 007625 174000 141225 003425 010400 131225 000001
320/ 000054 112242 005302 001375 005303 001403 005237 112770
340/ 000755 000207 012702 000106 012703 112650 005737 177546
360/ 100375 113723 177546 010037 177546 000763 026000 144000
400/ 141224 173412 017402 074020 057777 063000 141221 062025
420/ 000400 157412 007011 141225 175412 140402 005025 157400
440/ 007011 141625 124025 116225 000001 000054 112356 012702
460/ 000106 112301 004737 112416 005302 001373 012702 000144
500/ 005001 004737 112416 005302 001373 000137 110546 105737
520/ 177564 100375 000501 026000 012000 057625 073220 103777
540/ 140400 124025 157625 037011 141225 176213 141003 005245
560/ 174400 141402 043025 157400 037011 110625 141620 175412
600/ 172402 000001 000054 112472 000137 110546 012704 001000
620/ 005237 177550 105737 177550 100403 005304 001373 000000
640/ 113702 177552 000207 000000 000000 000000 000000 000532
660/ 026000 060000 000225 000000 000000 000000 000000 000000
700/ 000000 000000 000000 000000 000000 000000 000000 000000
720/ 000000 000000 000000 000000 000000 157000 000001 000054
740/ 112606 000000 000000 000000 000000 000000 000000 000000
760/ 000000 000000 000000 000000 000000 000000 000000 000000
```
BLOCK NUMBER 00013
```
000/ 000000 000000 000000 000000 000670 026000 126000 000225
020/ 000000 000000 000000 000000 000000 000000 000000 000000
040/ 000000 000000 000000 000000 000000 000000 000000 000000
060/ 000000 000000 111000 000001 000054 112722 000000 000000
100/ 000000 000000 000000 000000 000000 000000 000000 000000
120/ 000000 000000 000000 000000 000000 000000 000000 000000
140/ 000000 000554 010000 174000 000625 177777 036074 177777
160/ 001000 052626 000001 000012 113012 000000 000000 000525
200/ 003000 022000 044215 000000 000000 000000 000000 000000
220/ 000000 000000 000000 000000 000000 000000 000000 000000
240/ 000000 000000 000000 000000 000000 000000 000000 000000
260/ 000000 000000 000000 000000 000000 000000 000000 000000
300/ 000000 000000 000000 000000 000000 000000 000000 000000
320/ 000000 000000 000000 000000 000000 000000 000000 000000
340/ 000000 000000 000000 000000 000000 000000 000000 000000
360/ 000000 000000 000000 000000 000000 000000 000000 000000
400/ 000000 000000 000000 000000 000000 000000 000000 000000
420/ 000000 000000 000000 000000 000000 000000 000000 000000
440/ 000000 000000 000000 000000 000000 000000 000000 000000
460/ 000000 000000 000000 000000 000000 000000 000000 000000
500/ 000000 000000 000000 000000 000000 000000 000000 000000
520/ 000000 000000 000000 000000 000000 000000 000000 000000
```

```
540/  000000 000000 000000 000000  000000 000000 000000 000000
560/  000000 000000 000000 000000  000000 000000 000000 000000
600/  000000 000000 000000 000000  000000 000000 000000 000000
620/  000000 000000 000000 000000  000000 000000 000000 000000
640/  000000 000000 000000 000000  000000 000000 000000 000000
660/  000000 000000 000000 000000  000000 000000 000000 000000
700/  000000 000000 000000 000000  000000 000000 000000 000000
720/  000000 000000 000000 000000  000000 000000 000000 000000
740/  000000 000000 000000 000000  000000 000000 000000 000000
760/  000000 000000 000000 000000  000000 000000 000000 000000
*
```

What is claimed is:

1. In an apparatus for recording on magnetic media a plurality of digital component signals which together comprise a television video information signal in the form of picture fields composed of horizontal lines separated by vertical blanking intervals, and for reproducing said component signals therefrom, comprising;

drive means for holding and rotatably driving magnetic recording means at a generally constant predetermined rotational speed;

said drive means including carriage means carrying a plurality of magnetic transducing means for recording on and reproducing from coaxial tracks on a plurality of recording surface portions of said magnetic recording means, individual transducing means being provided for individual ones of said recording surface portions;

signal processing means for applying the plurality of digital component signals to certain of said transducing means whereby each of said plurality of digital component signals is generally simultaneously recorded on a separate one of said plurality of surface portions, and for generally simultaneously reproducing said digital component signals from said separate surface portions and aligning the component signals so that they can be combined to reconstruct the television video information signals;

said carriage means being formed and arranged for carrying each of said transducing means in a manner whereby a plurality of said transducing means are caused to move in unison from one set of coaxial tracks to another set of coaxial tracks on said recording surface portions of said magnetic recording means for recording and reproducing a plurality of picture fields of television video information, there being one set of coaxial tracks for each individual picture field of television video information;

motor means for propelling said carriage and transducing means from a first set of said coaxial tracks to a second set of said coaxial tracks for switching from one picture field of television video information to the next;

motor control means for controlling the flow of power to said motor means for accelerating said carriage and transducing means in a direction from said first set of coaxial tracks to said second set of coaxial tracks and for controlling the flow of power to said motor means at a position of said transducer means intermediate that of said first and second sets of coaxial tracks for decelerating said carriage and transducer means so as to brake the motion of said carriage and transducer means in the region of said second set of coaxial tracks, said motor control means controlling said motor means so that the vertical blanking intervals separating recorded television picture fields occur at radially aligned regions of each recording surface of the magnetic recording means; and means for sensing the onset of the vertical blanking interval region of the coaxial tracks and for initiating operation of said motor control means for energizing said motor means prior to the occurrence of the vertical blanking interval region, whereby acceleration of said carriage and transducer means toward the next set of coaxial tracks is commenced prior to the occurrence of the vertical blanking interval region so that said carriage and transducer means will transit the vertical blanking interval region between sets of coaxial tracks substantially within the period of the vertical blanking interval of the television video signal.

2. The apparatus as defined in claim 1 wherein said magnetic recording means comprises a plurality of recording discs, each having first and second sides for recording television video information, and said signal processing means includes formating means for causing the digital component signals representative of a first set of consecutive fields of television video signals to be recorded on a first set of coaxial tracks on said first side of said recording discs and for causing the digital component signals representative of a next set of consecutive fields of television video signals to be recorded on the second sides of said recording discs with the transition between said first and second sets of fields of television video signals occurring at given radial distance from the center of said respective recording discs, whereby substantially continuous recording of television video field signals is obtained.

3. The apparatus of claim 1 including means for continuing operation of said transducer means during the vertical blanking interval of the television video signal being transduced, whereby electronic lock to the word sync portion of the television video signal being transduced is facilitated during transit of said transducer means between consecutive television video signals within the vertical blanking interval.

4. The apparatus as defined in claim 1 wherein said motor control means includes first and second sources of current of opposite sign, and means for reversing the flow of current to said motor means as the transducer means transits the vertical blanking interval region for decelerating said carriage and transducer means.

5. The apparatus of claim 4 wherein said motor control means includes first and second one shot means for producing first and second consecutive pulses each of predetermined duration, said first one shot means responsive to the means for sensing the onset of the vertical blanking interval region to initiate said first pulse prior to the occurrence of the vertical blanking interval region; and wherein said first and second current sources are responsive to said first and second pulses respectively for controlling the acceleration and deceleration of said carriage and transducer means.

6. The apparatus of claim 5, including means for adjusting the two constant parameters of said first and second one shot means for adjusting the duration of each of said first and second consecutive pulses as produced by said respective one shot means.

7. In an apparatus for recording on magnetic media a plurality of digital component signals which together comprise a television video information signal in the form of picture fields composed of horizontal lines separated by vertical blanking intervals, and for reproducing said component signals therefrom, comprising;

drive means for holding and rotatably driving magnetic recording means at a generally constant predetermined rotational speed;

said drive means including carriage means carrying a plurality of magnetic transducing means for recording on and reproducing from coaxial tracks on a plurality of recording surface portions of said magnetic recording means, individual transducing means being provided for individual ones of said recording surface portions;

signal processing means for applying the plurality of digital component signals to certain of said transducing means whereby each of said plurality of digital component signals is generally simultaneously recorded on a separate one of said plurality of surface portions, and for generally simultaneously reproducing said digital component signals from said separate surface portions and aligning the component signals so that they can be combined to reconstruct the television video information signals;

said carriage means being formed and arranged for carrying each of said transducing means in a manner whereby a plurality of said transducing means are caused to move in unison from one set of coaxial tracks to another set of coaxial tracks on said recording surface portions of said magnetic recording means for recording and reproducing a plurality of picture fields of television video information, there being one set of coaxial tracks for each individual picture field of television video information;

motor control means for propelling said carriage and transducing means from a first set of said coaxial tracks to a second set of said coaxial tracks for switching from one picture field of television video information to the next;

said magnetic recording means comprising a plurality of recording discs, each having first and second sides for recording television video information, and said signal processing means includes formatting means for causing the digital component signals representative of a first set of consecutive fields of television video signals to be recorded on a first set of coaxial recording tracks on said first side of said recording disc and for causing the digital component signals representative of a next set of consecutive fields of television video signals to be recorded on the second sides of said recording discs with the transition between said first and second sets of fields of the television video signal occurring at a given radial distance from the center of said respective recording discs, whereby substantially continuous recording of television video field signals is obtained; and means for sensing the onset of a selected circumferential sector of the recording discs and for initiating operation of said motor control means for commencing acceleration of said carriage and transducing means from one set of coaxial tracks toward another set of coaxial tracks prior to the occurrence of the selected circumferential sector, said circumferential sector selected to coincide with the vertical blanking interval of the television video signal whereby the carriage and transducing means transit the selected circumferential sector between sets of coaxial tracks substantially within the period of said vertical blanking interval.

* * * * *